No. 654,825. Patented July 31, 1900.
E. F. BÖTTCHER.
DEVICE FOR TRANSPORTING PASSENGERS FROM AND ONTO MOVING CARS.
(Application filed June 10, 1898.)
(No Model.) 3 Sheets—Sheet 1.
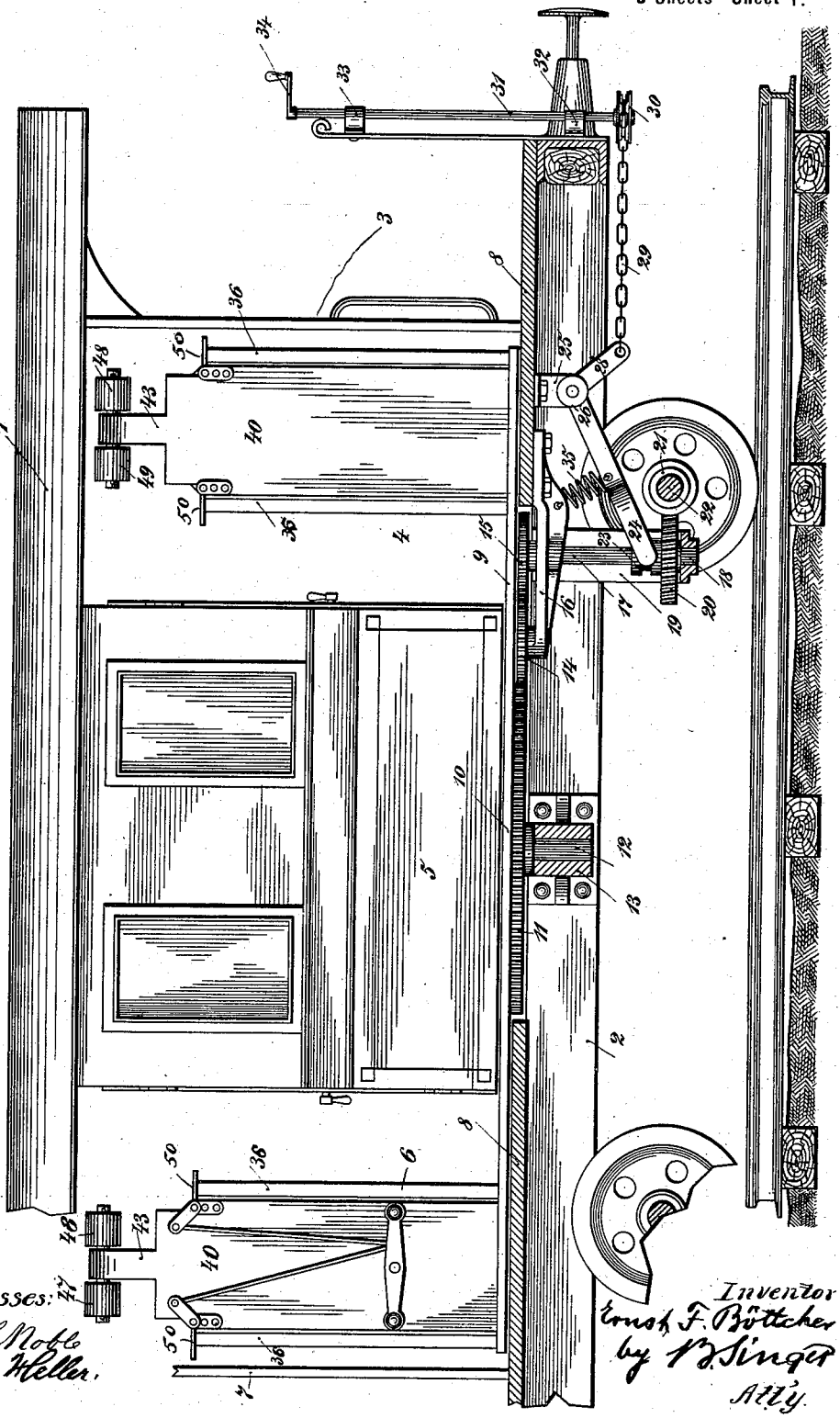

No. 654,825. Patented July 31, 1900.
E. F. BÖTTCHER.
DEVICE FOR TRANSPORTING PASSENGERS FROM AND ONTO MOVING CARS.
(Application filed June 10, 1898.)
(No Model.) 3 Sheets—Sheet 2.
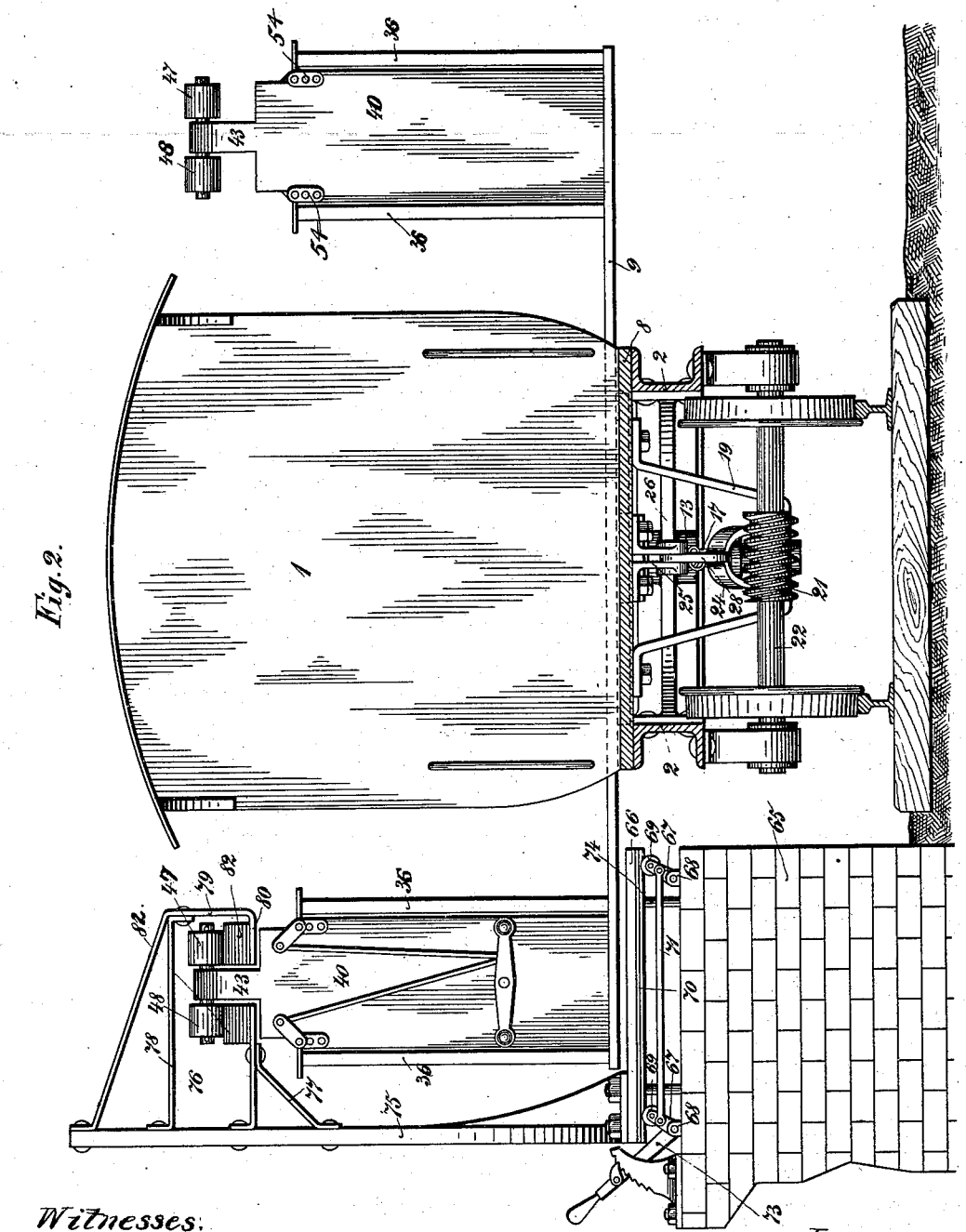

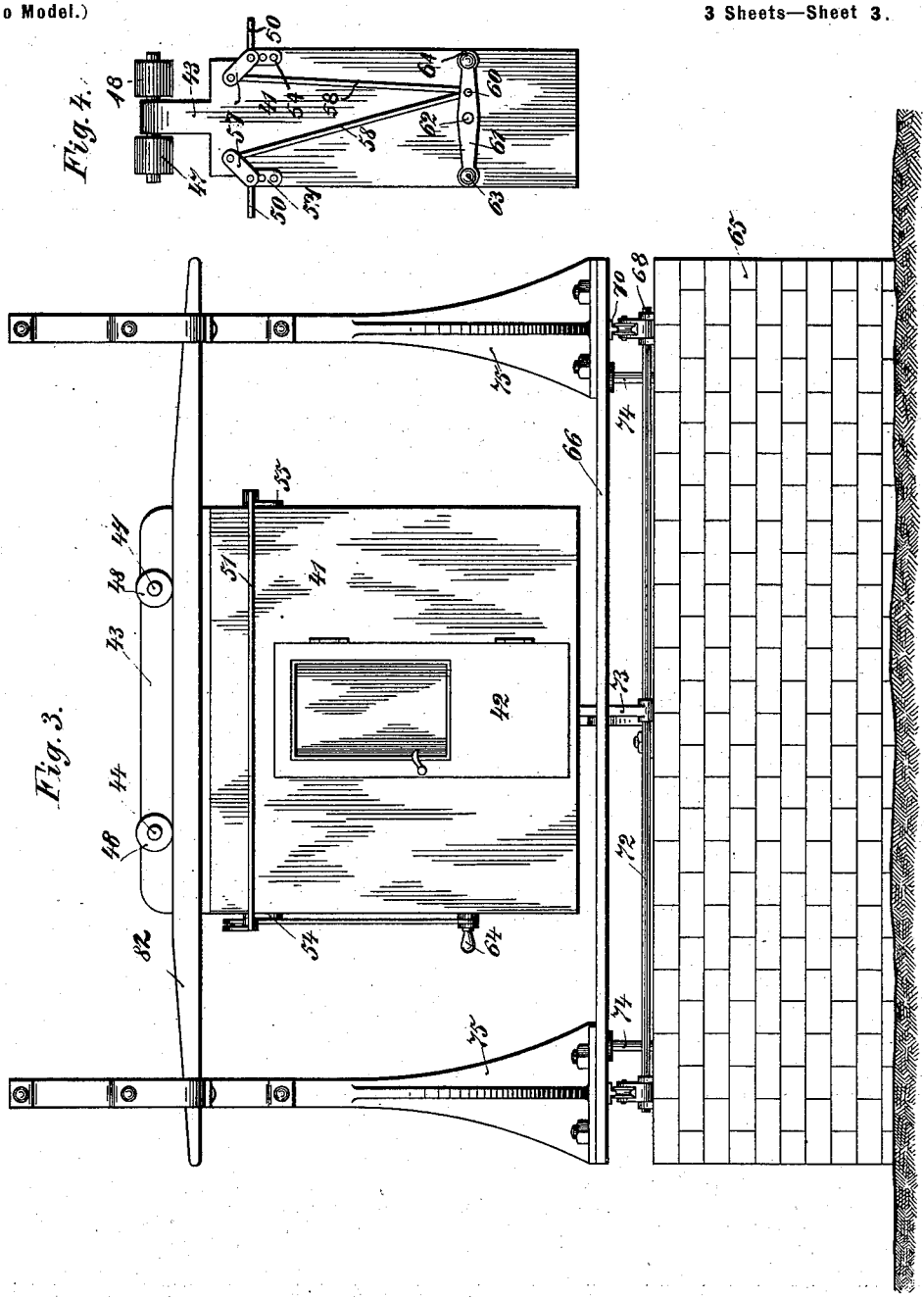

UNITED STATES PATENT OFFICE.

ERNST FRIEDRICH BÖTTCHER, OF LENGENFELD, GERMANY.

DEVICE FOR TRANSPORTING PASSENGERS FROM AND ONTO MOVING CARS.

SPECIFICATION forming part of Letters Patent No. 654,825, dated July 31, 1900.

Application filed June 10, 1898. Serial No. 683,130. (No model.)

*To all whom it may concern:*

Be it known that I, ERNST FRIEDRICH BÖTTCHER, a subject of the King of Saxony, and a resident of Lengenfeld, in the Kingdom of Saxony, Germany, have invented certain new and useful Improvements in Apparatus for Conveying or Transporting Passengers from and onto Railway-Cars while the Latter are in Motion, of which the following is a specification.

In the accompanying drawings, which form a part of this application, Figure 1 represents in side elevation a car equipped with my invention. Fig. 2 represents the same car in end view in the act of transferring a cab to a platform, forming a part of this invention. Fig. 3 is a front elevation of a cab in position on the platform. Fig. 4 is a detail showing in elevation the interior of a cab.

Referring to the drawings, 1 represents a car mounted on a suitable truck 2, supplied with suitable bolsters, axles, and ground-wheels common to railway-cars. Secured to the truck at each end of the car is a fixed platform 8, and superimposed thereon is a rotatable platform 9. Secured to the under side of the platform 9, between the inner ends of the platform 8, is a circular rack or toothed wheel 11, which is mounted on a vertical shaft 12, having bearings in a box 13, secured to the central portion of the truck, thus furnishing a support for the platform 9 and the parts secured thereto. Meshing with the teeth of the rack or wheel 11 is a pinion 14, mounted on a stud at the outer end of the bracket 16, said pinion in turn meshing with the pinion 15, secured to the upper end of the vertical shaft 17, on the lower end of which is a worm-wheel 20, which is geared to the worm 21, keyed on the axle 22 in a manner to be thrown out of gear when desired—that is to say, the worm-wheel 20 is secured to a collar 23, adapted to slide vertically on the shaft 17, said collar having an annular groove in which fit the forked ends of a lever 24, which is fixed on a square shaft 26, having bearings in the brackets 25, bolted to the under side of the platform 8. A lever 28 is fixed on said shaft and has secured to its free end a chain 29, which is wound around a wheel 30, operated by means of a vertical rod 31, which is suitably mounted in brackets 32 33 and is supplied with a handle 34. Other means may be used for raising and lowering the worm-wheel 20, so that it may be thrown in and out of gear with the worm 21, and the arrangement shown forms no part of my invention. It will be seen, however, that this construction provides for the rotation of the platform when the cars are in motion, and the worm and worm-wheel are put in gear by the action of the rod and that they will be normally kept out of gear by the action of the spring 35, which is secured to the lever 24 and the bracket 16, as shown in Fig. 1.

Fixed to the platform 8, near the ends of the latter, are partitions 3 and 7, between which the platform 9 is positioned. On the ends of the platform 9 are cabs 4 and 6, each of which is built as follows: The cab proper, 40, is made with four walls, the sides 41 being longer than the end walls and having doors 42 therein. From the top of the end walls are extensions 43, in which axles 44 are secured, on the outer ends of which wheels or rollers 48 are mounted. Secured to the end walls are plates 54, in which bearings are formed for horizontal side plates 50, which extend alongside the cab and are pivotally mounted in the plates 54. Secured to the plates 50 at an upward angle are levers 57, to the inner ends of which are secured rods 58, the lower ends of which are connected with the double lever 61, which is pivoted at 62 to the end of the cab and is provided with handles 63 64. Normally the plates 50 rest upon the upper edge of the walls 36, which extend on each side of the cab, and are fixed to the platform 9 and serve when the cab is on the platform as a support for the said cabs. When it is desired to release the cab from the platform, the handle 63 is pressed down, thus turning the plates 50 upwardly on their pivotal points in the plates 54. The cab is removed from the platform 9 by means of the mechanism now to be described.

At the sides of the railway-track where stations are desired elevated platforms or foundations, as 65, are built, and upon same are mounted adjustably platforms 66, to which are bolted uprights 75, having forwardly-extending arms or brackets 77 and 78, supporting, respectively, rails or beams 82, which are formed with their upper edge inclined downwardly from the central portion toward each end. These rails are so positioned that as a cab is brought around by the rotation of the platform 9 the rollers ride on the upper edge of said rails, thus lifting the cab from the platform 9, the plates 50 having been released from the side walls 36 by the action of the lever 61, as heretofore described. The height of the platform 66 is adjusted by means of a lever 73, which is secured to a rocking bar 72, on the ends of which are mounted arms 67, carrying rollers 69 in their free ends, said rollers contacting with the lower sides of rails 70, secured to the bottom of the platform 66. Similar arms and rollers are mounted under the front part of the platform in bearings 68, the two sets of such parts being connected by rods 71. Other suitable arrangements for raising and lowering the platform 66 may be utilized within the scope of my invention.

In the central portion of the platform 9 is a fixed car 5, in which the passengers ride until they are ready to be delivered at a station, when they will pass into one of the cabs. The brake 34 will be operated, causing the platform 9 to be rotated. When the cab is in line with the rails 82, it will be lifted from the platform and carried by the momentum of the train along said rails until stopped at the central portion thereof by inertia. In transporting a passenger from a station to a moving car the reverse of the operation described will take place, the platform 9 moving under the cab, the platform 66 being lowered, and the plates 50 being dropped.

Having thus described my invention, what I claim, and desire to obtain by Letters Patent, is—

1. In a device for transporting passengers from and onto cars, a cab mounted on a rotatable platform secured to a car, said cab having rollers on its top, in combination with a station-platform having rails supported thereon in position to engage said rollers upon the rotation of said platform, the upper edges of said rails being inclined upwardly from the ends toward the middle, in the manner and for the purpose described.

2. In a device for transporting passengers from and onto cars, a cab removably mounted on a rotatable platform secured to a car, said cab having rollers on its top, in combination with a station-platform having rails supported thereon in position to engage said rollers upon the rotation of said rotatable platform, the upper edges of said rails being inclined upwardly from the ends toward the middle, and means for adjusting the height of said station-platform, substantially in the manner and for the purpose set forth.

3. In a device for transporting passengers from and onto cars, a cab removably mounted on a rotatable platform, means for removably securing said cab on said platform, means for rotating said platform, rollers mounted at the top of said cab, in combination with a station-platform having rails supported thereon in position to engage said rollers upon the rotation of said rotatable platform, the upper edges of said rails being inclined upwardly from the ends toward the middle, and means for adjusting the height of said station-platform.

In witness whereof I subscribe my signature in presence of two witnesses.

ERNST FRIEDRICH BÖTTCHER.

Witnesses:
WILLIAM FIEDLER,
OTTO SCHNEIDER.